United States Patent Office 3,010,968
Patented Nov. 28, 1961

3,010,968
PROCESS FOR MANUFACTURE OF CERTAIN ALKYL ESTERS OF BENZIMIDAZOLE CARBAMIC ACIDS
Harvey M. Loux, Claymont, Del., assignor to E. I. du Pont de Nemours and Company, Wilmington, Del., a corporation of Delaware
No Drawing. Filed Nov. 25, 1959, Ser. No. 855,281
1 Claim. (Cl. 260—309.2)

This invention relates to a new and valuable process for the manufacture of alkyl esters of certain benzimidazole carbamic acids.

More particularly, this invention relates to processes for making alkyl esters of benzimidazole-2-carbamic acids represented by the formula (1)
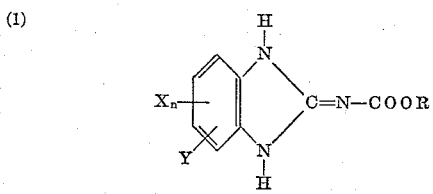

where:
X is hydrogen, halogen, alkyl of less than 7 carbon atoms, or alkoxy of less than 7 carbon atoms,
$n$ is whole positive integer less than 4 (i.e., 1, 2, or 3),
Y is hydrogen, chlorine, nitro, methyl, or ethyl,
R is aliphatic hydrocarbon of less than 7 carbon atoms (alkyl of less than 7 being preferred)

The term "halogen" is used conventionally to refer to the elements fluorine, chlorine, bromine, and iodine.

Compounds of Formula 1 may exist in three tautomeric forms, as follows:

(2)
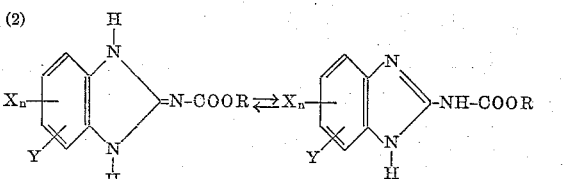

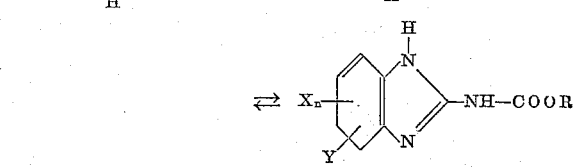

where R, Y, X, and $n$ are as above defined in Formula 1.

The compounds of Formula 1 are useful as fungicides and also are useful as intermediates in the preparation of dialkyl esters of 2-carboxyaminobenzimidazole-1-carboxylic acids represented by the formula (3)
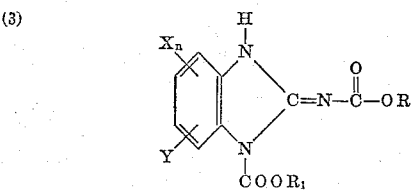

where X, Y, and $n$ are as above-defined in Formula 1, R and $R_1$ are the same or different selected from the group as above-defined in Formula 1 for R.

Compounds of Formula 3 are disclosed and claimed in U.S. Patent No. 2,933,504. Some compounds of Formula 1 are disclosed as starting materials for the new compounds in U.S. Patent No. 2,933,504.

My invention is most surprising and unexpected, and has significant commercial value, because it enables one to prepare the compounds of Formula 1 in a single reaction vessel and in an aqueous system with no isolation of intermediates. Then, from these compounds one can readily prepare the valuable fungicides of Formula 3.

The processes of my invention can be summarized by the following equations:

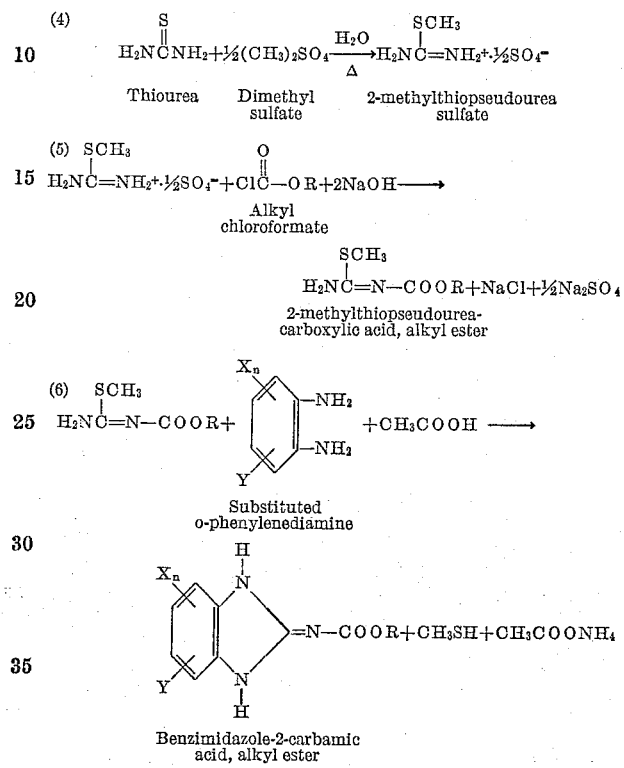

The benzimidazole-2-carbamic acid, alkyl esters of Equation 6 are easily converted to the esters shown in Formula 3 above. This conversion reaction is summarized by the following equation (7)
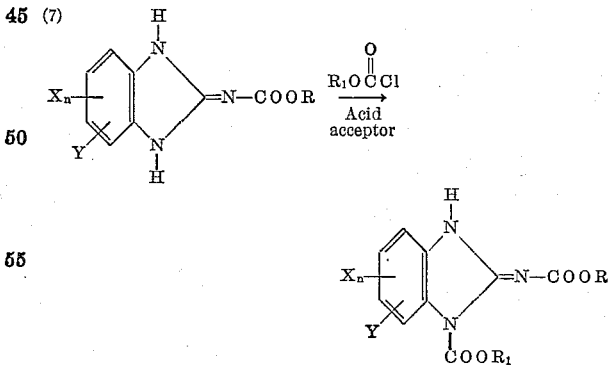

In the foregoing equations (4 through 7) the various substituents have the same meaning assigned to them as in Formulas 1 and 3 above.

As can be seen from the above equations the compounds of Formula 1 are prepared by a 3-reaction sequence. This sequence involves no isolation of intermediates. The first reaction consists in mixing thiourea with dimethylsulfate to produce in solution 2-methylthiopseudourea sulfate. The second reaction consists of addition to the reaction mixture of an alkyl chloroformate followed by (or simultaneously with) a base to produce an acylated 2-methylthiopseudourea. The third step consists of addition of a protonic acid and an o-phenylenediamine to produce benzimidazoles of Formula 1.

The protonic acid of step three preferably has an ionization constant lying between $1 \times 10^{-2}$ and $1 \times 10^{-7}$. More preferred are carboxylic acids, and most preferred are formic, acetic, and propionic acids. However, such acids and acid salts as sodium bisulfate, sodium dihydrogen phosphate, phosphoric acid, and the like perform quite satisfactorily. Mixtures of acids are sometimes desirable, especially of those acids tending to form a buffered solution, as for example, approximately equivalent amounts of phosphoric acid and sodium dihydrogen phosphate.

The first reaction (summarized by Equation 4 above) consists of the addition of 0.5 to 0.75 molecular equivalents (based on the thiourea) of dimethylsulfate to a mixture of preferably finely divided thiourea and a small volume of water. Although the ratio of thiourea to water is not critical, it is desirable from a practical point of view to keep the volume low. For this reason a ratio of thiourea to water of from about 4:1 to about 1:4 is preferred.

The addition of dimethylsulfate to thiourea can take place in any convenient manner depending upon such variables as the convenience afforded by the particular apparatus used, the scale of the reaction, and the like. Thus, the addition may take place in from one to 30 minutes or perhaps all at once if a one mole or smaller reaction scale is involved. As the exothermic first stage of this reaction progresses, the temperature rises considerably, even as high as the boiling point in some cases. Subsequent to this exothermic first stage, I prefer to maintain reflux conditions for ½ to 1 hour; however, temperatures as low as 90° C. or even lower, with a correspondingly longer reaction time, are operable. To assure that a reaction is complete, I continue refluxing for about thirty minutes to one hour after the addition is completed.

Depending on the volume of water used initially, the resulting mixture may or may not have a solid phase. In any event, I add enough water to form an aqueous solution of the resulting mixture. The next reaction can be begun as soon as this first reaction is completed.

The second reaction of the sequence is carried out (see Equation 5) by using the mixture from the first reaction. This resulting mixture is treated with 1 to 2 (preferred about 1.3) molecular equivalents (based on the amount of thiourea used) of lower alkyl chloroformate and 1.5 to 3 molecular equivalents (based on the amount of thiourea used) of a base derived from the class consisting of alkali metal hydroxides and alkaline earth metal hydroxides in aqueous solution. Preferably, alkali metal hydroxides are used. Examples of these are NaOH, KOH, $Ca(OH)_2$, and $Mg(OH)_2$. Dilute solutions of these bases add volume unnecessarily, so more concentrated solutions are preferred.

During the addition of lower alkyl chloroformate and base, the reaction mix temperature is preferably maintained in the range of from about $-10$ to $+50°$ C. The alkyl chloroformate can be added all at once, followed by addition of the base at such a rate as to maintain a pH of 4 to 9 (preferably 7 to 8). Alternatively, the alkyl chloroformate and base can be added simultaneously at rates such as to maintain the above-mentioned pH. If the pH rises above 9 for any length of time, the yield is lessened considerably. If the pH falls below 4 for any length of time, the reaction slows down or stops. At the end of the reaction the mixture may consist of liquid and solid phases and is suitable for use in the third reaction. The end of the second reaction is indicated by a significant decrease in the rate of pH changes.

I note that this second reaction may yield as a byproduct a diacylated thiourea derivative, namely 2-methylthiopseudourea-1,3-dicarboxylic acid, dialkyl ester having the formula (8)
$$ROOC-NH-\underset{\underset{SCH_3}{|}}{C}=N-COOR$$

However, this diacylated compound of Formula 8 reacts in a manner similar to the mono-acylated compounds and thus leads to the same desired end product.

The third reaction of the 3-reaction sequence consists of addition to the mixture resulting from the second reaction of about 1 to 4 (preferably 1 to 2) molecular equivalents of protonic acid, and 0.5 to 2 (preferably 1) molecular equivalents of an o-phenylenediamine (see Equation 6 above).

The order of addition can be varied. Thus, the acid may be added first, with an addition time of, say, 1 to 30 minutes, followed by the o-phenylenediamine, which latter is added all at once. Or protonic acid and o-phenylenediamine may be mixed previously and added to the reaction mixture over, say, a 1 to 30 minute period. Or, the acid may be added until a pH of about 5 to 6 is reached, then the o-phenylenediamine may be added, followed by addition of more acid at such a rate as to maintain a pH of 4 to 8 (preferably 5 to 6). In general, during the addition of the acid and the o-phenylenediamine, the pH of the reaction mixture is maintained in the range of from about 4 to 8. A pH greater than 8 and less than 4 is disadvantageous because the reaction proceeds more slowly and the yields are lower.

After the above-described addition of o-phenylenediamine (and acid) as above described, the resulting mixture is stirred at about 30–100° C. for 10 hours to 30 minutes until the reaction is complete, the shorter time being sufficient at the higher temperatures. During the addition of the acid and the o-phenylenediamine, the temperature of the reaction medium is maintained in the range of from about 30° C. to 100° C.

After this period of agitation, the mixture is allowed to cool to, say, 0–40° C. and the benzimidazole-2-carbamic acid ester is isolated by filtration. Any conventional filtration means can be used.

The by-products from these three reactions remain in solution with the exception of methyl mercaptan, which is given off in gaseous form. To prevent contamination of the air, this methyl mercaptan can be trapped by any convenient means. For example, a concentrated alkali solution is satisfactory for this purpose. All of the starting materials used can be of technical grade.

Compounds of Formula 3 can be prepared from compounds of Formula 1 by treating a suspension of a compound of Formula 1 in a small amount of organic solvent, such as acetone, containing one equivalent of an acid acceptor compound, such as sodium bicarbonate, with one equivalent of alkyl chloroformate. Agitation is continued until $CO_2$ evolution ceases or until a sample of the slurry is completely soluble in a mixture of chloroform and water.

At this point, water is added to the acetone slurry and the desired product filtered off in relatively pure form. Traces of impurity are readily removed by recrystallization. This procedure is described in greater detail in U.S. Patent No. 2,933,504.

The processes of this invention possess a number of advantages over the prior art. For one thing, all the steps involved, starting with commercially available raw materials, may be carried out in one reaction vessel with no isolation of intermediates. Such a method of carrying out the reactions is a most advantageous one commercially and is entirely unknown to the prior art. For another, the processes of this invention result in much higher yields of compounds of Formula 1 than those obtainable by prior art methods.

Also, one can use water as a solvent throughout the processes. In the final step, as described in the prior art, ethanol is used as the solvent. This improvement has obvious economic advantages and results in increased product yield.

Furthermore, less than 2 molecular equivalents of lower alkyl chloroformate is required, as compared with the two molecular equivalents known to the prior art. Obviously, this invention is a great advance over the prior art.

In order that the invention can be better understood, the following examples are given in addition to those set forth above:

EXAMPLE 1

A mixture of 228 parts of thiourea and 110 parts of water is treated over a five minute period with 244 parts of dimethyl sulfate. Rapid agitation is used throughout the whole procedure. The temperature of the reaction mixture rises to 95° C., then begins to subside. The material is brought to reflux by application of heat and held at reflux for 30 minutes, then cooled to −3° C., and treated with 535 parts of methyl chloroformate in one portion. A 25% solution of aqueous sodium hydroxide is added at such a rate as to keep the pH of the reaction mixture between 6 and 7 and the temperature below 25° C. When the pH of the mixture reaches 6.9 and the rate of change of pH has become negligible, the addition of base is stopped. The amount of base required is 1085 parts by volume of 25% solution. The temperature at the end of this addition is 23° C. Immediately after completion of the base addition, 360 parts of glacial acetic acid is added over a 20 minute period, followed by 324 parts of o-phenylenediamine in one portion. The resulting mixture is slowly warmed to 80° C. and held there for 30 minutes, then cooled to 27° C. and the light tan solid benzimidazole-2-carbamic acid, methyl ester isolated by filtration, washed well with water and acetone, and air-dried. The amount of product obtained is 455 g. (80% based on thiourea used).

EXAMPLE 2

To a mixture of 11 parts of water and 15 parts of technical thiourea is added 14.3 parts of dimethyl sulfate. The progress of the reaction is indicated by a sharp increase in temperature. The rate of addition of the dimethyl sulfate is adjusted so that the reaction temperature does not exceed 100° C. but approaches 100° C. at the end of addition. When all the dimethyl sulfate has been added, the mixture is heated at reflux for 1 hour then cooled and diluted with 108 parts of water. To this mixture is added simultaneously 24.3 parts of methyl chloroformate and a 25% aqueous sodium hydroxide solution. The temperature throughout the addition is held at 35 to 45° C. The methyl chloroformate is added gradually and the base is added at such a rate as to maintain a pH of 7 to 8 and a temperature of 25 to 40° C. After completion of the methyl chloroformate addition the addition of base is continued—maintaining a pH of 7 to 8 until very small increments of base produce marked changes in pH. The final pH remains above 7 after a 15 minute hold period. Sufficient formic acid is now added to bring the pH to about 5.5 followed by 23.5 parts of o-phenylenediamine. The pH begins to rise after addition of the diamine. More formic acid is added in order to maintain a pH of about 5.5. The mixture is stirred well at 40–50° C. for 30 minutes, then slowly warmed to 80° C. After 30 minutes at this temperature, it is cooled to 30° C. and the pale tan solid collected, washed well with water, and acetone, and dried. The benzimidazole-2-carbamic, methyl ester is obtained in essentially pure form. During the last step, i.e., after addition of the o-phenylenediamine, the off gases are passed through a scrubber containing 20% aqueous sodium hydroxide in order to prevent atmospheric contamination by methyl mercaptan.

EXAMPLE 3

A mixture of 76 parts of thiourea and 40 parts of water is treated all at once with 70 parts of dimethyl sulfate. The reaction temperature rises to 95° C., then begins to subside at which point heat is applied. After one hour at reflux, the mixture is cooled to 25° C. To it is added all at once 138 parts of methyl chloroformate followed by gradual (over a 40 minute period), addition of dry sodium carbonate at such a rate as to keep the pH under 8. An ice bath is used to keep the reaction temperature at 25° C. When the rate of pH change has become negligible, the base addition is stopped and the reaction mixture is treated all at once with a mixture of 108 parts of o-phenylenediamine and 60 parts of propionic acid. The resulting mixture is stirred at 40° C. for 5 hours. The reaction product is collected by filtration and washed well with water and acetone.

EXAMPLES 4 TO 10

Examples 4 through 10 are prepared by the procedure of Example 1. The alkyl chloro formate and o-phenylenediamines used and the products obtained in Examples 4 through 10 are those listed in Table I. The amounts of the starting materials are equivalent on a molecular basis to those of Example 1.

*Table I*

| Ex. No. | Starting Materials | | Product |
|---|---|---|---|
| | Alkyl Chloroformate | o-Phenylenediamine | |
| 4 | hexyl chloroformate. | 4-methyl-5-nitro-o-phenylenediamine. | 5-methyl-6-nitrobenzimidazole-2-carbamic acid, hexyl ester. |
| 5 | propyl chloroformate. | 3,5-dichloro-o-phenylenediamine. | 4,6-dichlorobenzimidazole-2-carbamic acid, propyl ester. |
| 6 | methyl chloroformate. | 4-fluoro-o-phenylenediamine. | 5-fluorobenzimidazole-2-carbamic acid, methyl ester. |
| 7 | ethyl chloroformate. | 3-nitro-o-phenylenediamine. | 4-nitrobenzimidazole-2-carbamic acid, ethyl ester. |
| 8 | amyl chloroformate. | 3,6-dichloro-4-methyl-o-phenylenediamine. | 4,7-dichloro-5-methyl-benzimidazole-2-carbamic acid, amyl ester. |
| 9 | isopropyl chloroformate. | 4,6-dimethyl-3-chloro-o-phenylenediamine. | 5,7-dimethyl-4-chloro-benzimidazole-2-carbamic acid, isopropyl ester. |
| 10 | methyl chloroformate. | 4-methoxy-o-phenylenediamine. | 5-methoxybenzimidazole-2-carbamic acid, methyl ester. |
| 11 | butyl chloroformate. | 3,4,5,6-tetrachloro-o-phenylenediamine. | 4,5,6,7-tetrachloro-benzimidazole-2-carbamic acid, butyl ester. |
| 12 | methyl chloroformate. | 4,5-dichloro-3-isopropoxy-o-phenylenediamine. | 5,6-dichloro-4-isopropoxybenzimidazole-2-carbamic acid, methyl ester. |
| 13 | ethyl chloroformate. | 4-bromo-5-butyl-o-phenylenediamine. | 5-bromo-6-butyl benzimidazole-2-carbamic acid, ethyl ester. |
| 14 | isobutyl chloroformate. | 3,4,5,6-tetramethyl-o-phenylenediamine. | 4,5,6,7-tetramethyl-benzimidazole-2-carbamic acid, isobutyl ester. |

The claim is:

A liquid phase process for the preparation of compounds of the formula

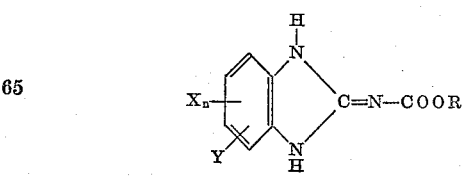

where:
  X is selected from the group consisting of hydrogen, halogen, alkyl of less than 7 carbon atoms, and alkoxy of less than 7 carbon atoms,
  Y is selected from the group consisting of hydrogen, chlorine, nitro, methyl and ethyl R is selected from the group consisting of aliphatic hydrocarbon of less than 7 carbon atoms, and $n$ is a positive whole number of less than four, said process comprising the steps of (a) adding 0.5 to 0.75 molecular equivalents of dimethylsulfate (based on the thiourea) to a mixture consisting of a ratio of thiourea to water of from about 4:1 to 1:4, maintaining reflux temperatures for a time necessary to complete the reaction, and then adding sufficient water to form an aqueous solution of the resulting mixture, (b) adding to such mixture 1 to 2 molecular equivalents (based on the thiourea) of lower alkyl chloroformate and 1.5 to 3 molecular equivalents based on the thiourea) of base selected from the class consisting of alkali metal hydroxides and alkaline earth metal hydroxides, the addition of such base being at such a rate as to maintain the pH of the resulting mixture in the range of 4 to 9, the reaction mixture being maintained in the range of about $-10$ to $+50°$ C., (c) adding to the resulting mixture 1 to 4 molecular equivalents (based on thiourea) of an acid having an ionization constant of from $1 \times 10^{-2}$ to $1 \times 10^{-7}$ and 0.5 to 2 molecular equivalents of o-phenylenediamine at respective rates of addition such that the pH of the resulting mixture is maintained in the range from 4 to 8, the reaction mixture being maintained in the range of about 30° C. to 100° C., and thereafter agitating the resulting mix at about 30–100° C. for from about 10 hours to 30 minutes to complete the reaction, then cooling such mix to about 0 to 40° C., and separating by filtration the desired product.

References Cited in the file of this patent

UNITED STATES PATENTS 2,933,504     Klopping  --------------- Apr. 19, 1960